United States Patent [19]

Guiseley

[11] 3,956,273

[45] May 11, 1976

[54] MODIFIED AGAROSE AND AGAR AND METHOD OF MAKING SAME

[75] Inventor: Kenneth B. Guiseley, Union, Maine

[73] Assignee: Marine Colloids, Inc., Rockland, Maine

[22] Filed: Sept. 20, 1973

[21] Appl. No.: 398,955

Related U.S. Application Data

[63] Continuation of Ser. No. 150,778, June 7, 1971, abandoned.

[52] U.S. Cl. .................. 260/209 R; 23/230 R; 424/361; 426/573
[51] Int. Cl.² ........................................ C08B 37/12
[58] Field of Search ............................ 260/209 R

[56] References Cited

UNITED STATES PATENTS

| | | | |
|---|---|---|---|
| 3,092,618 | 6/1963 | Rosen et al. | 260/209 R |
| 3,223,699 | 12/1965 | Schlageter | 260/209 R |
| 3,335,127 | 8/1967 | Polson | 260/209 R |
| 3,356,674 | 12/1967 | Ikeda et al. | 260/209 R |
| 3,507,851 | 4/1970 | Ghetie et al. | 260/209 R |
| 3,651,041 | 3/1972 | Schell et al. | 260/209 R |

Primary Examiner—Johnnie R. Brown

[57] ABSTRACT

A modified agarose or agar containing alkylated, alkenylated, acylated or hydroxyalkylated agarose in which the alkyl, alkenyl, and acyl groups contain from 1 to 3 carbon atoms and the hydroxyalkyl groups contain from 1 to 4 carbon atoms, which modified product has a gelling temperature at least 1°C. lower than the gelling temperature of the corresponding unmodified agarose or agar. The modified material also has a lowered melting point and a higher clarity than the unmodified. The product is made by alkylation, etc. either in a non-aqueous solvent or in an aqueous alkaline solvent; in the latter case the aldehyde end group of the unmodified material may be first blocked by reduction to the hydroxyl group. The compounds are useful as thickeners, for electrophoresis and for diffusive Interactions.

6 Claims, No Drawings

MODIFIED AGAROSE AND AGAR AND METHOD OF MAKING SAME application is a continuation of Ser. No. 150,778 filed June 7, 1971, now abandoned.

This invention relates to modified agarose and agar having lower gelling and melting temperatures than those of the corresponding unmodified agarose and agar, and to a method of modifying agarose and agar to lower their gelling and melting temperatures.

Both agar and agarose (one of the constituents of agar) in the form of aqueous gels have been widely used as culture media and as substrates for electrophoresis and for diffusive interactions of various kinds; agarose gels offer particular advantages because of their essentially non-ionic nature. In all such applications, as well as in the use of agar and agarose as thickeners in foods, cosmetics, and in other conventional uses of these materials, the gelling temperature is of particular importance. For example, although the gelling temperature of solutions of many samples of agar and agarose obtained from natural sources is about 35°–36°C., long standing of such solutions at a temperature of 40°C. or even higher frequently results in thickening or incipient gelation. In using such solutions for biological assays, it is therefore difficult to prepare specimens without operating at temperatures so high as to kill or inactivate the organisms or reagents employed.

Study of the varying methoxyl content of agarose obtained from natural sources has shown that samples having higher methoxyl content also have higher gelling temperatures.

It has now been discovered that by modifying the agarose by increasing the methoxyl content through a methylation reaction, the gelling temperature of agarose is lowered instead of raised. It has also been found that similar lowered gelling temperatures are obtained in the case of alkylated, alkenylated, acylated and hydroxyalkylated agarose in which the alkyl, alkenyl and acyl groups contain up to three carbon atoms and the hydroxyalkyl groups contain up to four carbon atoms. Various alkylation, alkenylation, acylation or hydroxyalkylation reactions may be employed to achieve the desired results.

The term "gelling temperature" as used herein means the temperature at which a liquid or sol hardens into a rigid gel upon cooling and is to be distinguished from gelatinization which involves hydration, as in the case of starch, for example. In particular, "gelling temperature" means the temperature at which hardening occurs when a solution containing 1.5% by weight of agarose or agar is cooled at the rate of 0.5°C. per minute.

The present invention is also useful with agar, which contains, along with agarose, agaropectin as well, since it is the agarose fraction which is responsible for gelation. Because no ionic groups are introduced into agar or agarose by the present invention, it is of particular value for providing agarose of low gelling temperature for use as a substrate in electrophoresis. A decrease in gelling temperature to as low as the freezing point of water or even lower can be achieved by the present invention.

Other important properties of agar and agarose are also improved by the present invention: melting temperature is decreased and clarity of the gel is increased.

The extent of alkylation, alkenylation, acylation or hydroxyalkylation required to achieve a specific extent of lowering of the gelling temperature varies depending to some extent upon the source and original gelling temperature of the unmodified agar or agarose as well as upon the identity of the particular alkyl, alkenyl, acyl or hydroxyalkyl group present. The extent of substitution can be defined in terms of the four theoretically available sites for reaction which are present in the disaccharide molecule composed of D-galactose and 3,6-anhydro-L-galactose, which disaccharide is the principal component of agarose. On this basis, a product in which all of the available sites have been completely reacted is a product having a degree of substitution (D.S.) of 4.0. As a specific example, the increase in D.S. of a hydroxyethylated product in accordance with the present invention can be computed as follows:

$$\text{Increase in D.S.} = \frac{306 \times \text{wt. percent hydroxyethyl}}{(100 \times 45) - (44 \times \text{wt. percent hydroxyethyl})}$$

In general, products of the present invention have an increase in D.S. from about 0.01 to about 1.0; while it is possible to achieve a greater increase in D.S., there is little advantage to an increase beyond 1.0. The minimum useful increase in degree of substitution for the most desirable and most widely useful products is that required to provide a modified agar or agarose having a gelling temperature at least 1°C. lower than that of the corresponding unmodified agar or agarose; as can be seen from the data given in the following examples, this amounts to an increase in D.S. of at least about 0.01, depending upon the particular substituent group present.

In carrying out the process of the present invention in an aqueous medium, as is generally preferred, the agar or agarose is first dissolved in strong aqueous alkali, about 0.5 to 1.5 molar in alkali metal hydroxide, after which a suitable reagent is added, such as dimethyl sulfate, ethyl bromide, 1-bromopropane, 2-bromopropane, 3-bromopropene, propylene oxide, ethylene oxide, 2-chloroethanol, epichlorohydrin, butylene oxide, diepoxybutane, and the like. Since some discoloration or darkening of the solution tends to occur during the reaction when it is carried out in aqueous alkaline solution, producing a product which is discolored although otherwise entirely satisfactory, it is also preferred to block the aldehyde end group of the agarose, for example by reduction, before bringing the agar or agarose into contact with aqueous alkali, thus preventing the color-forming reaction which involves the aldehyde group from taking place. The blocking agent of choice is a borohydride, particularly an alkali metal borohydride such as sodium borohydride, which reduces the aldehyde end group to an alcohol (hydroxy) group.

A difunctional reagent such as epichlorohydrin which is capable of producing cross-linking under appropriate conditions to form a water-insoluble product can be used only under conditions which prevent cross-linking and which result in a water-soluble product, i.e., soluble to the extent of at least 2% by weight at 90°C. As is well known, cross-linking can be avoided by employing a dilute (less than about 3.5% by weight) solution of agar or agarose for the reaction and by other techniques well known to those skilled in the art. Except for the necessity of avoiding formation of a water-insoluble product when difunctional reagents are used, there is nothing critical about the concentrations or other conditions employed.

The reaction is preferably carried out at an elevated temperature from about 70° to 100°C. or more, but lower temperatures may be used to minimize discoloration if the aldehyde end group is not blocked or to reduce loss when a relatively volatile reagent is used. At lower temperatures the reaction is slower and in some cases the selected reagent is decomposed by reaction with the water before the desired extent of reaction with agarose can be achieved.

After completion of the reaction, the mixture is cooled to 50°–60°C. (if it is at a higher temperature), the alkali is neutralized with an acid or is removed by dialysis or other conventional procedure, and the product is purified by conventional procedures. For example, the solution may be gelled by cooling, frozen and allowed to thaw, then washed and dried; or the product may be precipitated from the reaction solution by mixing with it a water-miscible organic liquid which is a non-solvent for the product, such as methanol, ethanol, propanol, acetone, etc. after which the precipitate is filtered, washed with the non-solvent and dried.

The process of the present invention can also be carried out in an organic solvent such as N,N-dimethylformamide, pyridine, or similar solvents; indeed, reaction in such a solvent is preferred by acylation, e.g., with acetyl chloride or propionyl chloride. Under these conditions, blocking of the aldehyde end group is usually unnecessary, little or no discoloration occurring during the reaction. In addition, acid anhydrides can be employed for acylation instead of acyl halides if desired.

The precise amount of alkylating, alkenylating, acylating or hydroxyalkylating agent employed depends upon the conditions of the reaction and the extent of substitution (D.S.) desired. Usually a large excess above the amount theoretically necessary is used because of the tendency of the agent to react to some extent with water, when present.

The following examples are intended to illustrate more fully the nature of the invention without acting as a limitation upon its scope.

EXAMPLE 1

Agarose (6g) was boiled in water (225 ml.) and the solution cooled to 80°C. Sodium borohydride (0.35g) was added, and the solution was kept, covered, for 10–15 minutes in an 80°C. bath. A solution of sodium hydroxide (15g) in water (100 ml.) was added, and to the solution was added dimethyl sulfate as indicated in Table I. Two hours later, the reaction mixture was cooled to 60°C. and neutralized with 3M acetic acid, using universal indicator. The neutral solution was mixed into 1.5 times its volume of 99% isopropyl alcohol. After the mixture cooled, the precipitated product was washed three times with 60% alcohol, squeezed as dry as possible, and dried in a circulating air oven at 60°C. To purify the several products, they were dissolved in water at 1% concentration, by weight, the solutions allowed to gel and the gels frozen. After thawing, much of the water flowed freely away, and the concentrated gel was washed with water and alcohol (to hasten drying) then dried at 60°C. The pertinent data and results are given in Table I for parent agarose I, which in its unmodified form had a gelling temperature of 36.5°C.

An agarose (parent agarose II) having a higher initial methoxyl content and higher gelling temperature (40.5°C.) was similarly treated, employing 5 and 10 ml. of dimethyl sulfate in two separate preparations, respectively. The reconstitution-gel-freeze-thaw purification step was deleted and replaced by additional washes with 60% isopropyl alcohol. The products were also analyzed to determine the methoxyl content and gelling temperature. (Table I).

TABLE I

| Sample | ml. Me$_2$SO$_4$ | %OCH$_3$ | Gelling Temp.°C | %OCH$_3$ Increase | Increase in D.S. | Gel Temp. Lowering |
|---|---|---|---|---|---|---|
| Parent Agarose 1 | 0 | 0.72 | 36.5° | 0 | 0 | 0 |
| A | 5 | 2.87 | 31° | 2.15 | 0.214 | 5.5° |
| B | 10 | 5.03 | 27° | 4.31 | 0.434 | 9.5° |
| C | 20 | 9.06 | 17° | 8.34 | 0.855 | 19.5° |
| Parent Agarose 2 | 0 | 1.85 | 40.5° | 0 | 0 | 0 |
| D | 5 | 3.42 | 37.5° | 1.57 | 0.156 | 3° |
| E | 10 | 5.52 | 32° | 3.67 | 0.368 | 8.5° |

EXAMPLE 2

A solution of 120 g. of agarose in 4500 ml. of water was prepared and incubated at 80°C. To this was added 25 ml. of 4.4M sodium borohydride in 14M aqueous sodium hydroxide. After 10 minutes, 2 liters of a solution containing 300 g of flake caustic was added. This was followed by 160 ml. of dimethyl sulfate added in 20 ml. portions over a period of about a minute. The mixture was stirred gently for 2 hours, then cooled to 52°C., neutralized with 3M acetic acid, and filtered with 85 g. Hyflo Super-Cel filter aid. The clear filtrate was added to 2.14 volumes of 85% isopropyl alcohol to effect precipitation of the product. The small-fibered precipitate was washed with 60% isopropyl alcohol, twice with water, and again with isopropyl alcohol of sufficient concentration to mix with the water in the methyl agarose to a concentration of about 60%. After drying at 60°C., 107.5 g. of methylagarose was obtained having a gelling temperature of 30.5°C. (compared with 36.5°C. for the parent agarose), a melting temperature of 73.5°C. (vs. 90°–91°C.), a methoxyl content of 3.38% (vs. 0.63%) and a markedly clearer gel than the parent agarose.

EXAMPLE 3

Two hundred fifty grams of agarose was dissolved in 4.5 kg. of water and incubated at 80°C. To the sol were added 50 ml. of 4.4M sodium borohydride in 14M aqueous sodium hydroxide and, after 15 minutes, 500 ml. of aqueous 34% by weight flake caustic solution. A solution of 100 ml. of 2-chloroethanol in 500 ml. of water was allowed to run into the stirred solution during a 10-minute period. After an additional hour, about 1.3 kg of cold water was added, followed by 1700 ml. of 3M acetic acid. The solution was diluted to 10 kg. and filtered after addition of 100 g. of Hyflow Super-Cel filter aid. The product was isolated by mixing the filtrate with 2.13 volumes of 85% isopropyl alcohol. The firmly matted fibers resulting were washed four times with 6-liter portions of 60% isopropyl alcohol and dried to yield 231.5 g of hydroxyethyl agarose having a gelling temperature of 28°C. and a melting temperature of 66°C. (compared with 36.5°C. and 93°C. respectively for the starting material). The clarity of the gel was better than that of the parent agarose as determined quantitatively by comparing a 5-cm. thickness of each gel at 1% concentration with a standard clay suspension in a Fisher Electrophotometer (a routine test used in water analysis). The parent agarose was equivalent to 198 ppm and the derivative prepared in this example, to 120 ppm of the clay suspension. Ethylene oxide could be substituted for the 2-chloroethanol with similar results.

EXAMPLE 4

Hydroxyethyl agarose was made from the same parent agar used in Example 3 using different ratios of 2-chloroethanol to agarose. The results are given in Table II.

TABLE II

| Sample | %$CH_2CH_2O$-$H^*$ Increase | Gelling Temp.°C. | Increase in D.S. | Gel Temp. Lowering |
|---|---|---|---|---|
| Parent Agarose | 0 | 36.5° | — | — |
| A | 3.44% | 28.5° | 0.242 | 8° |
| B | 4.02% | 28° | 0.285 | 8.5° |
| C | 5.75% | 24° | 0.414 | 12.5° |
| D | 10.62% | 10.5° | 0.806 | 26° |

*Analyzed by the modified Zeisel method of Morgan (Ind. Eng. Chem., Anal. Ed., 18, 500 (1946)) and Lortz (Anal. Chem., 28, 892 (1956)). The methoxyl content of 0.66% of the unmodified (parent) agarose was recalculated as hydroxyethyl (0.94%) to serve as a basis for the parent agarose and was subtracted from the hydroxyethyl values of all the samples for representation as percent hydroxyethyl increase. Sample B is the material prepared in Example 3.

EXAMPLE 5

A solution of agarose (6g) in water (225 ml.) was treated with 1 ml. of 4.4M sodium borohydride solution for 15 minutes at 80°C., then made strongly alkaline with 100 ml. of 3.75M sodium hydroxide. The temperature of the solution was then adjusted to a level compatible with the reagent to be used, and the reagent, as shown in Table III, was added. After an hour, the mixture was neutralized to about pH 6.8 with 3M acetic acid and the derivative isolated by precipitation from solution with 2.14 volumes of 85% isopropyl alcohol. Analyses were performed by Zeisel or modified Zeisel procedures, or, in the case of allylagarose, directly by bromine uptake. The results are presented in Table III.

EXAMPLE 6

Agar (6g.) having a gelling temperature of 44°C. was dissolved in water (225 ml.), reduced with sodium borohydride (1 ml. 4.4M) and made alkaline with 3.75M sodium hydroxide (100 ml.). With the temperature maintained at 80°C., dimethyl sulfate (5 ml.) was added and after an hour's reaction time, the mixture was cooled to 55°C. and neutralized to pH 6.8 with 3M acetic acid (108 ml.). The methylated agar was isolated by alcohol precipitation and after suitable washes and drying, was found to have a gelling temperature of 38.5°, a drop of 5.5° from that of the starting material.

EXAMPLE 7

Acylation of agarose was carried out in a non-aqueous system as follows: Agarose (21 g.) was dissolved in N,N-dimethyl-formamide (DMF) (to a total weight of 350 g.) by heating at 100°-110°C. in a heating mantle with good agitation. Three portions of 100 g. each (i.e., each containing 6 g. of agarose) were transferred to separate 200-ml. round-bottom flasks having a ground glass neck. Solutions of acetic anhydride ($Ac_2O$) in DMF (5 ml. diluted to 50 ml. with DMF) and of pyridine in DMF (8.52 ml. diluted to 50 ml. with DMF) were prepared and equal portions of each added to the three agarose solutions at levels of 5, 10, and 20 ml., respectively. The mixtures were incubated at 50°C. for about 18 hours, then added to 250 ml. of 75% isopropyl alcohol, whereupon the partially acetylated agarose was precipitated. Each was washed four times with 60% alcohol, then dried. The acetyl content was determined by the method used for pectin by Owens et al, Bureau of Agricultural and Industrial Chemistry, Western Regional Research Laboratory, U.S.D.A., Albany, California (1952) page 9, except that instead of transferring an aliquot to the distillation flask, an appropriate-sized sample was weighed directly into it and the saponification carried out directly in the flask. This was necessitated due to the insolubility of agarose at room temperature. Table IV indicates the extent to which the temperature of gelation was lowered under these conditions.

TABLE IV

| ml. of 10% $Ac_2O$ used | Gelling Temp.°C. | Increase in D.S. | Gel Temp. Lowering |
|---|---|---|---|
| 0 | 35.3° | 0.0 | 0° |
| 5 | 34° | 0.089 | 1.3° |
| 10 | 30° | 0.201 | 5.3° |
| 20 | 18° | 0.403 | 17.3° |

TABLE III

| Reagent | Derivative | Reaction Temp.°C. | Amt. Reagent | Increase in D.S. | Gel Temp. Lowering |
|---|---|---|---|---|---|
| Propylene oxide | Hydroxypropyl | 43° | 5.4 ml. | 0.141 | 4.5° |
| Propylene oxide | Hydroxypropyl | 42° | 10.8 ml. | 0.206 | 7.5° |
| Propylene oxide | Hydroxypropyl | 25° | 10.0 ml.* | 0.486 | 12.0° |
| 3-bromopropene | Allyl | 71° | 6.9 ml. | 0.125 | 8.0° |
| 3-bromopropene | Allyl | 71° | 13.8 ml. | 0.738 | 17.5° |
| 2-bromopropane | Isopropyl | 52° | 7.5 ml. | 0.013 | 1.3° |
| 2-bromopropane | Isopropyl | 52° | 15.0 ml. | 0.023 | 1.5° |
| 1-bromopropane | n-propyl | 65° | 7.3 ml. | 0.065 | 1.5° |
| 1-bromopropane | n-propyl | 65° | 14.6 ml. | 0.103 | 2.7° |

*10 ml. of propylene oxide for 5 g. of agarose slurried in 100 ml. of 1.15M sodium hydroxide containing 0.5 ml. of 4.4M sodium borohydride solution. The mixture was kept at about 25°C. for 65 hours.

EXAMPLE 8

A hot solution of 6 g. of agarose in 225 ml. of water was cooled to 50°C. and made strongly alkaline by the addition of 100 ml. of 3.75M sodium hydroxide solution. No sodium borohydride was used for color improvement. The mixture quickly turned yellow, and darkened rapidly. It was treated with 5 ml. of dimethyl sulfate and held at 50°C. for an additional hour, by which time, it was an intense greenish color. Neutralization with 3M acetic acid caused a lightening of the color to brown, then a deep rose. Isolation of the product by alcohol precipitation resulted in much of the color's dissolving in the mother liquor, but the product still had a pinkish brown color after washing and drying. The gelling temperature of the product was 31°C., a reduction of 5.5°C. from the starting material. A 1% gel prepared from this material was much clearer than a similar one made from the parent agarose, but had a definite pinkish-gray color. Nonetheless, it is clear that the end group reduction step may be omitted in the preparation of derivatives as disclosed herein.

EXAMPLE 9

A solution of 6 g. of agarose (gelling temperature, 36.5°C.) in 225 ml. of water was held at 80°C., treated with 0.35 g. of sodium borohydride for 10 minutes, made strongly alkaline with 100 ml. of 3.75M sodium hydroxide, held for 2 hours, and then reacted with epichlorohydrin (0.50 ml.) for an additional 2 hours. The mixture was cooled, neutralized, and the dihydroxypropylated product was obtained and washed as in the preceding examples. It had a gelling temperature of 34.3°C., which is a lowering of 2.2° from the original material.

What is claimed is:

1. A modified agarose containing additional groups substituted therein selected from the group consisting of alkyl and alkenyl groups each containing from 1 to 3 carbon atoms and hydroxyalkyl groups each containing from 1 to 4 carbon atoms, the increased degree of substitution above the corresponding unmodified agarose being from about 0.01 to about 1.0, said modified agarose being water-soluble and having a gelling temperature at least 1°C. lower than the gelling temperature of the corresponding unmodified agarose.

2. A modified agarose as claimed in claim 1 containing hydroxyl groups in place of the terminal aldehyde groups present in the corresponding unmodified agarose.

3. A modified agarose as claimed in claim 2 in which the additional groups substituted therein are methyl.

4. A modified agarose as claimed in claim 2 in which the additional groups substituted therein are hydroxyethyl.

5. A modified agar containing additional groups substituted therein selected from the group consisting of alkyl and alkenyl groups each containing from 1 to 3 carbon atoms and hydroxyalkyl groups each containing from 1 to 4 carbon atoms, the increased degree of substitution above the corresponding unmodified agarose being from about 0.01 to about 1.0, said modified agar being water-soluble and having a gelling temperature at least 1°C. lower than the gelling temperature of the corresponding unmodified agar.

6. A modified agar as claimed in claim 5 containing hydroxyl groups in place of the terminal aldehyde groups present in the corresponding unmodified agar.

* * * * *

UNITED STATES PATENT AND TRADEMARK OFFICE
CERTIFICATE OF CORRECTION

PATENT NO. : 3,956,273
DATED : May 11, 1976
INVENTOR(S) : Kenneth B. Guiseley

It is certified that error appears in the above–identified patent and that said Letters Patent are hereby corrected as shown below:

Column 1, line 5, before "application", insert the word --This--;

Column 5, line 21, change "agar" to --agarose--.

Signed and Sealed this

Twentieth Day of July 1976

[SEAL]

Attest:

RUTH C. MASON
Attesting Officer

C. MARSHALL DANN
Commissioner of Patents and Trademarks

REEXAMINATION CERTIFICATE (1740th)

United States Patent [19]
Guiseley

[11] B1 3,956,273
[45] Certificate Issued Jul. 14, 1992

US003956273A

[54] MODIFIED AGAROSE AND AGAR AND METHOD OF MAKING SAME

[75] Inventor: Kenneth B. Guiseley, Union, Me.

[73] Assignee: Marine Colloids, Inc., Springfield, N.J.

Reexamination Request:
No. 90/002,308, Mar. 25, 1991

Reexamination Certificate for:
Patent No.: 3,956,273
Issued: May 11, 1976
Appl. No.: 398,955
Filed: Sep. 20, 1973

Related U.S. Application Data

[63] Continuation of Ser. No. 150,778, Jun. 7, 1971, abandoned.

[51] Int. Cl.⁵ ............................................. C07H 15/04
[52] U.S. Cl. .................................... 536/120; 426/573; 426/516
[58] Field of Search ................. 536/1.1, 120; 426/573, 426/273; 436/516

[56] References Cited
PUBLICATIONS

"Carbohydrate Research Magazine", May 1970 issue, p. 247.
Araki, "Structure of Agarose, a Main Polysaccharide of Agar-agar", Science and Technology (1956) pp. 21-25.

*Primary Examiner*—Johnnie R. Brown

[57] ABSTRACT

A modified agarose or agar containing alkylated, alkenylated, acylated or hydroxyalkylated agarose in which the alkyl, alkenyl, and acyl groups contain from 1 to 3 carbon atoms and the hydroxyalkyl groups contain from 1 to 4 carbon atoms, which modified product has a gelling temperature at least 1° C. lower than the gelling temperature of the corresponding unmodified agarose or agar. The modified material also has a lowered melting point and a higher clarity than the unmodified. The product is made by alkylation, etc. either in a non-aqueous solvent or in an aqueous alkaline solvent; in the latter case the aldehyde end group of the unmodified material may be first blocked by reduction to the hydroxyl group. The compounds are useful as thickeners, for electrophoresis and for diffusive Interactions.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-6 are cancelled.

* * * * *

REEXAMINATION CERTIFICATE (2034th)["] B1 3,956,273

United States Patent [19]

Guiseley

[45] Certificate Issued  Jun. 8, 1993

[54] MODIFIED AGAROSE AND AGAR AND METHOD OF MAKING SAME

[75] Inventor: Kenneth B. Guiseley, Union, Me.

[73] Assignee: Marine Colloids, Inc., Springfield, N.J.

Reexamination Request:
No. 90/002,308, Mar. 25, 1991

Reexamination Certificate for:
Patent No.: 3,956,273
Issued: May 11, 1976
Appl. No.: 398,955
Filed: Sep. 20, 1973

Related U.S. Application Data

[63] Continuation of Ser. No. 150,778, Jun. 7, 1971, abandoned.

[51] Int. Cl.$^5$ ............................................ C07H 15/04
[52] U.S. Cl. .................................. 536/120; 426/573; 436/516; 536/1.1
[58] Field of Search .................. 536/1.1, 120; 426/573; 436/516

[56] References Cited

PUBLICATIONS

Guiseley, Natural & Synthetic Derivatives of Agarose Industrial Polysaccharides, 1987 pp. 139 thru 147.
Araki, J. Chem. Soc. Jpn., 58, 1351–1359 (1937) JTT 1–12 Chemical Studies of Agar (Report IV) with English Translation.
Kirk, Othmer Encyclopedia of Chemical Technology, 3rd Edition vol. 5, 149,150 J. Witey & Sons, NY (1979).
The Agarose Monograph FMC Corporation (1982).
J. Chem. Soc. Japan 61, 775–781 (1940) without English Translation.
"Carbohydrate Research Magazine", May 1970 issue, p. 247 (copy enclosed).
Araki, "Structure of Agarose, a Main Polysaccharide of Agar-agar", Science and Technology (1956) pp. 21–25.

*Primary Examiner*—Johnnie R. Brown

[57] ABSTRACT

A modified agarose or agar containing alkylated, alkenylated, acylated or hydroxyalkylated agarose in which the alkyl, alkenyl, and acyl groups contain from 1 to 3 carbon atoms and the hydroxyalkyl groups contain from 1 to 4 carbon atoms, which modified product has a gelling temperature at least 1° C. lower than the gelling temperature of the corresponding unmodified agarose or agar. The modified material also has a lowered melting point and a higher clarity than the unmodified. The product is made by alkylation, etc. either in a non-aqueous solvent or in an aqueous alkaline solvent; in the latter case the aldehyde end group of the unmodified material may be first blocked by reduction to the hydroxyl group. The compounds are useful as thickeners, for electrophoresis and for diffusive Interactions.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–6 is confirmed.

\* \* \* \* \*